United States Patent
Maurus

(10) Patent No.: US 6,893,687 B2
(45) Date of Patent: May 17, 2005

(54) METHOD FOR COATING METALLIC SURFACES

(75) Inventor: Norbert Maurus, Langen (DE)

(73) Assignee: Chemetall GmbH, Frankfurt am Main (DE)

(*) Notice: Subject to any disclaimer, the term of this patent is extended or adjusted under 35 U.S.C. 154(b) by 41 days.

(21) Appl. No.: 10/380,709

(22) PCT Filed: Sep. 25, 2001

(86) PCT No.: PCT/EP01/11034

§ 371 (c)(1), (2), (4) Date: Jun. 20, 2003

(87) PCT Pub. No.: WO02/24820

PCT Pub. Date: Mar. 28, 2002

(65) Prior Publication Data

US 2004/0022951 A1 Feb. 5, 2004

(30) Foreign Application Priority Data

Sep. 25, 2000 (DE) .......................... 100 47 686
Sep. 20, 2001 (DE) .......................... 101 46 446

(51) Int. Cl.$^7$ ................................. B05D 3/06
(52) U.S. Cl. ................. 427/508; 427/517; 427/518; 427/519; 427/520
(58) Field of Search ................ 427/508, 517, 427/518, 519, 520

(56) References Cited

U.S. PATENT DOCUMENTS

| 4,640,938 A | 2/1987 | Romer et al. |
| 5,178,915 A | 1/1993 | Moyle et al. |
| 6,011,078 A | 1/2000 | Reich et al. |
| 6,211,262 B1 * | 4/2001 | Mejiritski et al. ............ 522/71 |

FOREIGN PATENT DOCUMENTS

| DE | 43 02 124 A1 | 7/1994 |
| DE | 197 20 292 C1 | 6/1998 |
| DE | 197 15 382 C1 | 11/1998 |
| DE | 198 18 312 A1 | 10/1999 |
| DE | 198 35 206 A1 | 2/2000 |
| EP | 0 033 899 B1 | 3/1983 |
| EP | 0 175 035 | 3/1986 |
| EP | 0 344 717 | 12/1989 |
| EP | 0 551 727 A1 | 7/1993 |
| EP | 0 311 906 B1 | 1/1994 |
| EP | 0 507 053 B1 | 8/1995 |
| EP | 0 841 100 A1 | 5/1998 |
| EP | 0 872 502 A1 | 10/1998 |
| EP | 0 952 170 A1 | 10/1999 |
| JP | 61-043665 * | 3/1986 |

* cited by examiner

*Primary Examiner*—Erma Cameron
(74) *Attorney, Agent, or Firm*—Fulbright & Jaworski L.L.P.

(57) ABSTRACT

The invention relates to a method for coating metallic surfaces by wetting one such surface with an aqueous dispersion containing, in addition to water, at least one UV-cross-linkable, water-soluble and/or water-dispersible resin, at least one wax as a deforming additive, at least one photoinitiator and at least one corrosion inhibitor. The coating is dried and hardened after being formed on the metallic surface. The invention is characterised in that the coating that is formed is up to 10 μm thick when hard, and in that during a condensation water test according to DIN 50017 KFW carried out directly after over 240 hours, said coating shows no signs of corrosion >5% on a test surface having been deformed by a mandrel with a diameter of 3.2 mm to 38 mm during a mandrel bending test according to DIN ISO 6860 without cracking the test surface.

44 Claims, No Drawings

METHOD FOR COATING METALLIC SURFACES

The invention relates to a method of coating metallic surfaces and also to the use of the substrates thus coated.

Methods of coating metallic surfaces with an aqueous dispersion which in addition to water comprises at least one UV-crosslinkable resin and at least one photoinitiator are fundamentally known. They are used for coating with UV paints or similar UV-curing organic coatings. Methods of this kind are customarily intended for the coating of floor coverings, wood elements, cork elements, plastics parts, paper, films or packaging, but are not suitable for the rapid and corrosion-resistant coating, for example, of strip-form metallic material at speeds of 10 to 250 m/min. It is known that UV curing is outstandingly suitable in principle for curing coatings on temperature-sensitive substrates without exposure to relatively high temperatures. Moreover, the majority of organic coatings on metallic substrates such as metal sheets, for example, for the processing industry are coated with solventborne or with aqueous varnishes which must be thermally dried, crosslinked and/or cured. All these aforementioned coatings presently normally exhibit thicknesses in the region of far more than 20 $\mu$m and in some cases well over 100 $\mu$m. In many cases, UV curing may have the advantage that a corrosion-resistant, robust organic coating can be applied solventlessly.

To the knowledge of the applicant, no UV-curing organic, sufficiently flexible, and at the same time sufficiently corrosion-resistant coating has to date been applied to metallic strips. There is a need to propose aqueous dispersions which take account of the altered conditions of use of paintlike compositions that arise in the case of rapid strip coating and which cure not thermally, or substantially not thermally, but instead cure with induction by active radiation. In the text below, actinic radiation is referred to as UV radiation and the crosslinking induced thereby as UV curing.

It was therefore an object to propose a method of coating metallic substrates which is also suitable for the coating of fast-moving strips and with which it is possible to apply organic, sufficiently flexible, and at the same time sufficiently corrosion-resistant coatings. This method ought to be suitable for economic and substantially environmentally friendly industrial implementation.

The object is achieved in accordance with the invention by a method of coating metallic surfaces by wetting this surface with an aqueous dispersion which in addition to water comprises at least one UV-crosslinkable water-soluble and/or water-dispersible resin, at least one wax as forming additive, at least one photoinitiator, and at least one corrosion inhibitor, the coating which has formed on the metallic surface being dried and cured, said method being characterized in that a coating is formed which in cured form has a thickness of up to 10 $\mu$m and which on a test surface subjected to forming in a mandrel bending test in accordance with DIN ISO 6860—but without cracking of the test surface—with a mandrel of from 3.2 mm to 38 mm in diameter produces no signs of corrosion >5 area-% in the course of an immediately following condensation climate test in accordance with DIN 50017 KFW over 240 hours.

For the purposes of this application the term "dispersion" is used as a generic term embracing, for example, emulsions, microemulsions, and suspensions.

The forming additive, which may also have a corrosion inhibiting effect, may at the same time also be the corrosion inhibitor, so that it is not necessary to add different additives for forming and for inhibiting corrosion.

This corrosion resistance is preferably achieved if testing is carried out in this way over 1200 hours or with particular preference over 2400 hours and still no signs of corrosion >5% become discernible on the test surface which has been subjected to forming.

In the case of the method of the invention the cured layer preferably has a sufficient handling strength. In particular it may have a Persos pendulum hardness in the range from 30 to 550 s.

For the method of the invention the dispersion may comprise a resin or a mixture of resins selected from the group consisting of derivatives on the basis of acrylate, epoxide, phenol, polyethylene, polyurethane, polyester, and styrene. The resins stated here may on the stated basis be present in the dispersion individually, as a mixture and/or in chemically bonded form and may be present as monomer, oligomer, polymer, copolymer and/or derivatives thereof, with all transitional forms being possible.

The amount of binders, i.e., of resins and corresponding derivatives, is preferably from 18 to 80% by weight, preferably from 22 to 75% by weight, in particular from 25 to 45% by weight, based on the solids content. In the case of coating units which produce a relatively thick wet film—in the range from 5 to 15 $\mu$m, for instance—on the substrate, a fairly low concentration of binders will be preferred. Conversely, in the case of coating units which produce a relatively thin wet film—in the range from 1.5 to 8 $\mu$m, for instance—a high concentration of binders will tend to be used. Where a reactive diluent is used, this additive is taken into account as binder content.

Additionally the dispersion may comprise at least one photoinitiator selected from the group consisting of acetophenone, anthraquinone, benzoin, benzophenone, 1-benzoylcyclohexanol, phenyl ketone, thioxanthone, and derivatives thereof, or at least one organophosphorus compound such as, for example, an acylphosphine oxide. The dispersion preferably comprises the photoinitiator with an amount of from 0.1 to 7% by weight, more preferably with an amount of from 0.5 to 5% by weight. In the course of UV irradiation, the photoinitiator is converted into at least one free radical and/or cation which initiates or promotes the polymerization.

The amount of additives such as, for example, biocide, defoamers, adhesion promoters, catalysts, corrosion inhibitors, wetting agents, pigments, forming additives, etc. can be from 0.1 to 24% by weight, preferably from 3 to 18% by weight, more preferably from 5 to 12% by weight. Since often ready-to-use dispersions are employed, the amount of emulsifiers is part of the raw material basis of the binders and is therefore included here in the amount of the binders. Wetting agents often also serve as adhesion promoters.

The amount of separately added water, which is not added in the form of a dispersion or solution, can be from 0 to 40% by weight, preferably from 5 to 25% by weight, more preferably from 8 to 18% by weight. However, it may also be preferable to add additives and/or binders in place of this water or in place of some of this water.

The total water content of the dispersion of the invention can be from 20 to 95% by weight, preferably from 25 to 85% by weight. The total water content depends essentially on the desired conditions of use.

For rapid strip coating, for example, a total water content in the range from 70 to 80% by weight may be particularly of interest, while for the coating of parts the corresponding range is from 85 to 95% by weight.

The dispersion may comprise at least one corrosion inhibitor selected from the group consisting of organic, inorganic, and organometallic compounds, coated or uncoated inorganic pigments such as Fe2O3, SiO2 and/or TiO2, for example, nanoparticles, aluminum phosphates, antimony compounds such as antimony hydroxide, zinc phosphates, zinc salts of aminocarboxylates, of 5-nitroisophthalic acid or cyanic acid, polymeric amino salts with fatty acids, TPA-amine complexes, phosphates and/or carbonates based on titanium or zirconium, metal salts of dodecylnaphthalenesulfonic acid, amino complexes and transition metal complexes of toluenepropionic acid, silanes, and 2-mercaptobenzothiazolylsuccinic acid and/or amino salts thereof. It is also possible to add an addition of conductive polymers, especially for reasons of corrosion control. The amount of at least one corrosion inhibitor varies preferably in the range from 0.4 to 10% by weight, more preferably in the range from 0.6 to 6% by weight.

The dispersion also comprises at least one forming additive. It may comprise at least one wax as forming additive, in particular a wax selected from the group consisting of paraffins, polyethylenes and polypropylenes, especially an oxidized wax. The dispersion may, inter alia, have been stabilized anionically or cationically, since in that case it can be held in homogeneous distribution in the aqueous composition with ease. The melting point of the wax used as lubricant can be in the range from 40 to 160° C., in particular in the range from 120 to 150° C. The amount of at least one forming additive is preferably from 0.3 to 10% by weight, more preferably from 0.6 to 8% by weight, with particular preference at least 1% by weight. The amount of wax in the coatings produced with the dispersion of the invention is important in order to allow forming to be carried out with easier sliding, which owing to the relatively low forces leads to defect-free reformed surfaces. In this way, cracks and instances of flaking in this coating are avoided. Defects and instances of flaking quickly lead to severe signs of corrosion.

To this dispersion it is possible to add, as an inorganic compound in particle form, a finely divided powder or a dispersion with fine particles of, for example, a carbonate, oxide, silicate or sulfate. This inorganic compound can be added to the dispersion in the form of particles in a particle size distribution substantially in the range from 5 nm to 300 nm, preferably in the range from 6 to 100 nm, more preferably in the range from 7 to 60 nm, very preferably in the range from 8 to 25 nm. As inorganic compound in particle form it is possible with preference to add particles based on alumina, barium sulfate, silica, silicate, titanium oxide, zinc oxide and/or zirconium oxide. It is, however, also possible to add electrically conductive particles such as those based on coated pigments, graphite/carbon black, iron phosphide, iron oxide and/or molybdenum sulfide, for example.

As organic solvent for the organic polymers it is possible to use at least one water-miscible and/or water-soluble alcohol, a glycol ether, N-methyl-pyrrolidone and/or water. Where a solvent mixture is used a mixture of at least one long-chain alcohol, such as propylene glycol, an ester alcohol, a glycol ether and/or butanediol with water, is particularly advisable; otherwise it is advisable to use water alone, especially deionized water. The amount of organic solvent here can be from 0.1 to 5% by weight, preferably from 0.2 to 2% by weight.

The acid groups of the synthetic resins may be stabilized using ammonia and/or using amines such as, for example, morpholine, dimethylethanolamine, diethylethanolamine or triethanolamine and/or using alkali metal hydroxides such as, for example, sodium hydroxide.

The aqueous composition may where appropriate comprise in each case at least one biocide, one defoamer and/or one wetting agent. The dispersion may also comprise a wetting agent, based in certain circumstances on polysiloxanes. The amount of individual examples of these substances, where used, should be as low as possible. Their amount in total should not exceed 1% by weight.

As biocide it is possible with preference to use oxane derivatives, formaldehyde donors and/or hydroxy-methyl ureide. As defoamers it is possible with preference to use those based on polysiloxane and/or on hydrophobic solids.

The metallic surface may be composed essentially of aluminum, iron, copper, magnesium, nickel, titanium, zinc and/or of an alloy containing aluminum, iron, copper, magnesium, nickel, titanium and/or zinc, or of two or more of these metallic substances.

The metallic surface may have been cleaned and/or galvanized, especially freshly cleaned or freshly galvanized, the galvanization possibly consisting of zinc or of a zinc-containing alloy such as, for example, a zinc alloy containing aluminum and/or containing iron. It has preferably been hot dip alloy galvanized or electrolytically galvanized or coated with an aluminum-zinc alloy such as Galfan® or Galvalume®.

The metallic surface may comprise at least 80% of aluminum and may have been cleaned, where appropriate pickled, where appropriate anodized, and where appropriate passivated. Anodizing—where appropriate after pickling—may be an alternative to pickling and passivating.

The metallic surface may be cleaned and, where appropriate, pretreated, in particular pretreated with a pre-treatment solution based on fluoride, iron-cobalt and/or phosphate.

The metallic surface may be contacted with the dispersion by the roller application method, by wetting and squeezing off, by flow coating or by dipping, with a wet film being developed.

The metallic surface may be wetted with the dispersion for a time of from 0.001 second up to 30 minutes; in the case of the rapid coating of a strip in particular for a time of from 0.001 to 1 second and, in the case of the coating of parts, from 10 seconds to 30 minutes, preferably for from 1 to 5 minutes.

On coating with the dispersion the metallic surface may have a temperature in the range from 5 to 60° C., preferably in the range from 15 to 30° C., more preferably from 18 to 25° C. On coating the dispersion may have a temperature in the range from 5 to 60° C., preferably from 15 to 30° C., more preferably from 18 to 25° C.

The metallic surface contacted with the dispersion may be dried by air-circulation heating methods, inductively and/or by radiant heat, with the volatile fractions of the dispersion possibly being removed, where appropriate, by blowing.

The metallic surface contacted with the dispersion can be dried at a substrate temperature in the range from room temperature up to 180° C.; in the case of rapid strip coating and in the case of parts, preferably in the range from 50 to 100° C., it being possibly necessary for parts to be dried for a longer time, in particular for from 10 to 30 minutes.

When it has been dried so as to be substantially or entirely free of water, the metallic surface contacted with the dispersion can be irradiated with UV light, preferably in the range from 180 to 500 nm, in order to implement or initiate the polymerization reaction. Irradiation is preferably performed for from 0.005 second to 5 minutes, in the case of rapid strip coating preferably for from 0.005 to 1 second, and in the case of parts preferably for from 1 second to 1 minute. The output of the UV emitters is presently preferably in the range from 20 to 250 W/cm. In the case of substrates of complex shape, such as shaped parts, for example, it is in many cases advisable to use a plurality of UV emitters and also, where appropriate, mirrors in order to prevent the organic coating having unirradiated portions or in order to be able to cure the entire coating at one and the same time.

Before or both before and during the UV cure, the metallic surface contacted with the dispersion may be physically dried. This physical drying is particularly important for the constituents of the resin which are unable to crosslink by UV curing.

It is possible to form an organic coating which, after curing, has a coatweight in the range from 0.2 to 20 g/cm$^2$, preferably in the range from 0.6 to 12 g/cm$^2$, in particular in the range from 1 to 5 g/cm$^2$. In the case of coatings which include inorganic additives such as pigments, for example, for a given coat volume the coatweight is generally much higher than without these additives.

The cured organic coating may have a thickness of from 0.1 to 10 µm, preferably from 0.3 to 5 µm, more preferably from 0.5 to 3 µm.

The cured coating may be readily paintable. Paintability, however, is not ensured from the outset in every case.

The coated metal parts, wires, strips or strip sections may be coated with at least one further organic coating, in particular with a coating material such as, for example, a topcoat, an adhesive coat, an adhesive backing, a film, a foam and/or a print coat.

The substrate with the cured coating may where appropriate be cut, formed or joined to another part by adhesive bonding, welding, soldering, clinching, riveting or otherwise. Soldering is possible only on bare substrates, so that for that purpose the coating must be removed at least in part. In the case of welding it is advisable for the organic coating of the invention to have a thickness of on average not more than 3 µm, preferably not more than 1.5 µm, and also, where appropriate, a relatively high fraction of at least one electrically conductive compound, especially electrically conductive particles of less than 1 µm in average size. The fraction of at least one electrically conductive compound or of electrically conductive particles is in that case preferably from 5 to 75% by weight, more preferably from 10 to 60% by weight, based on the solids content, it being necessary to adapt the composition of the mixture of the remaining constituents accordingly when there are relatively high fractions of electrically conductive substance. The thinner the coating of the invention, the lower can be the fractions of electrically conductive substance in the aqueous mixture. They may then in certain circumstances lie at levels below 30% by weight, preferably below 18% by weight, based on the solids content.

The dispersion of the invention can also be utilized substantially or entirely free from heavy metals such as chromium, copper, and nickel. Particular preference is given to chromium-free methods in which no chromium is deliberately added. The dispersion of the invention may also have a composition which is free of organic solvents.

In the case of strip coatings this method can be employed in such a way that it need not be used on a separate strip coating line but instead can be applied on the same line following an operation, for example, of galvanizing. Indeed, this is often possible with no loss of capacity on the line.

The coating method of the invention is preferably employed at application temperatures in the range from 15 to 40° C. with drying and UV curing preferably only at 40 to 80° C., since there is no need to heat the dispersion or to heat the coated substrate for the purpose of crosslinking, thereby allowing a corresponding energy saving as compared with thermal curing.

If the amounts of pigments and coloring substances added are not too great, the coating of the invention can be made transparent, so allowing the visual impression of a metallic surface to be retained to a very substantial extent. In the case of the coating of metallically coated steel sheets with thin organic coatings it is desirable for the microstructure and the coloring of the metallic surface to remain visible, since this is often needed as a design feature, in the case, for example, of galvanized metal sheets in the architectural sector.

It was additionally surprising that the coating method of the invention led to coatings which allow severe extension as in the case of forming, for example, on the conical mandrel very substantially without cracking—indeed, without notable detractions from the corrosion resistance.

The inventive coating with dispersions in accordance with Examples 1 to 4 surprisingly proved equivalent to the chromium-free coatings on Galvalume® in the outdoor weathering test.

In view of the high corrosion resistance it is necessary only in certain instances, or only for reasons of color coating and/or effect coating, to overcoat the coating of the invention.

The substrates coated by the method of the invention can be used as wire, wire winding, wire mesh, metal sheet, paneling, shielding, bodywork or part of a bodywork, part of a vehicle, trailer, recreational vehicle or aircraft, covering, casing, lamp, light, traffic light element, furniture item or furniture element, element of a household appliance, frame, profile, shaped part of complex geometry, guide-rail element, radiator element or fence element, bumper, part of or with at least one pipe and/or one profile, window frame, door frame or cycle frame, or as a small part such as, for example, a bolt, nut, flange, spring or a spectacle frame. The dispersion of the invention may serve for producing a coating which is used as a primer, in particular as a lubricating primer or welding primer.

EXAMPLES

The subject matter of the invention is illustrated below with reference to examples.

Hot-dip-galvanized steel panels (Z) and Galvalume®-coated steel panels (AZ) were coated with the aqueous dispersion of the invention of the examples according to the invention after alkaline cleaning. This dispersion was prepared by intensive mixing (dissolver) of the components indicated in Table 1.

TABLE 1

Composition of the aqueous UV-curable dispersions and results of the investigations on the coated substrates. Amounts in % by weight, corrosion figures in area-%.

| Example | 1 | 2 | 3 | 4 |
|---|---|---|---|---|
| coating on steel | Z | Z | AZ | AZ |
| polyurethane dispersion A | 85.0 | — | — | — |
| acrylic-polyurethane hybrid | — | 70.8 | 70.8 | 70.8 |
| polyethylene glycol diacrylate | 1.6 | — | — | — |
| polyurethane dispersion B | — | 8.0 | 8.0 | 8.0 |
| styrene-acrylate copolymer | — | 6.0 | 6.0 | 6.0 |
| polyethylene wax emulsion | 2.0 | 2.0 | 2.0 | 2.0 |
| acid adduct 4-oxo-4-p-tolyl butyrate, 4-ethylmorpholine | 1.0 | 1.0 | 1.0 | 1.0 |

TABLE 1-continued

Composition of the aqueous UV-curable dispersions and results of the investigations on the coated substrates. Amounts in % by weight, corrosion figures in area-%.

| Example | 1 | 2 | 3 | 4 |
|---|---|---|---|---|
| hydroxycyclohexyl phenyl ketone, benzophenone | 0.9 | 0.9 | 0.9 | 0.9 |
| polyether-modified polydimethyl-siloxane | 0.2 | 0.2 | 0.2 | 0.2 |
| added fully deionised water | 9.3 | 11.2 | 11.2 | 11.2 |
| total binder content | 31.35 | 30.58 | 30.58 | 30.58 |
| total water content | 66 | 67 | 67 | 67 |
| coatweight (g/m$^2$) | 3.0 | 3.0 | 1.5 | 3.0 |
| results of the DIN 50017 KFW test: | | | | |
| areal corrosion, 240 h | 0% | <5% | <1% | <1% |
| conical mandrel 3.2 to 38 mm, 240 h | <5% | <5% | <5% | <5% |
| areal corrosion, 1200 h | <5% | <5% | <5% | <5% |
| conical mandrel 3.2 to 38 mm, 1200 h | <5% | <5% | <20% | <20% |
| results of the DIN 50021 salt spray test, 24 h: | | | | |
| areal corrosion | 20% | 20% | <1% | <10% |
| edge corrosion | 3 mm | 3 mm | <1 mm | <1 mm |
| conical mandrel 3.2 to 38 mm | 20% | 50% | 20% | 10% |

The polyurethane dispersion A used was an aqueous UV-curing dispersion with a particle size of less than 100 nm, a solids content of 35% by weight, and a pH of 7.5. The polyurethane dispersion B employed was an aqueous, non-UV-curing dispersion with a solids content of 35% by weight and a pH of 8.0. The acrylic-polyurethane hybrid (copolymer) is an aqueous UV-curing dispersion with a solids content of 40% by weight and a pH of 7.0. The polyethylene glycol diacrylate is an aqueous, UV-curing solution with a solids content of 100% by weight and with an acid value of 25. The styrene-acrylate copolymer is an aqueous dispersion with a solids content of 50% by weight and a pH of 8.0 which improves the adhesion to the substrate surface. The polyethylene wax emulsion has a solids content of 50% by weight, a melting point in the range from 62 to 95° C., and a pH of 9.5. The presence of this emulsion significantly enhances the slip properties and forming properties. The 4-oxo-4-p-tolyl butyrate-4-ethylmorpholine acid adduct corrosion inhibitor as a TPA-amine complex enhances the corrosion control and at the same time the adhesion of the polymer coating to the substrate. The mixture of hydroxycyclohexylphenyl ketone and benzophenone serves as a photoinitiator for initiating the polymerization in the case of the UV cure. The polyether-modified polydimethylsiloxane wetting agent enhances the surface wettability and so the adhesion to the substrate surface. The addition of deionized water serves to adjust the solids content and the viscosity.

Coatings were applied at room temperature by roller application and drying, and had a thickness approximately in the range from about 1.2 to 3.5 μm. The coated substrates were dried in a circulating air oven at about 50 to 90° C. and were subsequently irradiated in continuous travel with UV-C light from a 160 W/cm mercury lamp. Virtually complete polymerization took place within two seconds.

The results of the condensation climate test in accordance with DIN 50017 KFW over 240 h show an adhesive strength which ranges from adequate to good but which can be further increased significantly by addition of a larger amount of corrosion inhibitor(s) The results of the salt spray test in accordance with DIN 50021 over 24 h are sufficient for a chromium-free system and can likewise be further increased significantly by adding a larger amount of corrosion inhibitor(s). Here again, the results of the salt spray test proved insufficiently representative. In the mandrel bending test in accordance with DIN ISO 6860, the test surface was not scored.

It was surprising that the coatings of the invention in long-term use over 12 months in an outdoor weathering test in accordance with VDA [German automakers association] 621-414 only showed a corrosion susceptibility on Galvalume® of <1% and on hot-dip-galvanized steel of <20% area corroded. Surprisingly, therefore, the coating of the invention with dispersions according to Examples 1 to 4 proved to be equal to the chromium-free coatings on Galvalume® in the outdoor weathering test.

A further improvement in corrosion control and in adhesive strength can be achieved by raising the amount of corrosion inhibitors: for example, by adding at least one corrosion inhibitor with a total content of up to 15% by weight, in particular as a mixture of two or more organic and/or inorganic corrosion inhibitors. Preferred corrosion inhibitors are TPA-amine complexes, silica in the form of nanoparticles, phosphates and/or carbonates based on titanium or zirconium.

With the dispersion of the invention it was possible to produce coatings which are good enough to be applied as permanent protection to the metallic surface in the form of a sole, very thin (1 to 4 μm) coating. Accordingly, the chromium-free method of the invention is extremely favorable in terms of cost as compared with other chromium-free coating methods, which normally require coat thicknesses in the region of more than 20 to 150 μm and in particular require a multicoat paint system.

What is claimed is:

1. A method of coating a metallic surface comprising wetting a metallic surface with an aqueous dispersion which comprises water and at least one UV-crosslinkable water-soluble or water-dispersible resin, at least one wax as forming additive, at least one photoinitiator, and at least one corrosion inhibitor, the coating which has formed on the metallic surface being dried and UV cured to form a coated metallic surface, wherein a coating is formed which in cured form has a thickness of up to 10 microns and which on a test surface subjected to forming in a mandrel bending test in accordance with DIN ISO 6860 but without cracking of the test surface with a mandrel of from 3.2 mm to 38mm in diameter produces no signs of corrosion >5% in the course of an immediately following condensation climate test in accordance with DIN 50017 KFW over 240 hours.

2. The method of claim 1, wherein the dispersion comprises at least one resin selected from the group consisting of derivatives on the basis of acrylate, epoxide, phenol, polyethylene, polyurethane, polyester, and styrene.

3. The method of claim 2, wherein the dispersion comprises at least one photoinitiator selected from the group consisting of acetophenone, anthraquinone, benzion, benzophenone, 1-benzylcyclohexanol, phenyl ketone, thioxanthone, and derivatives thereof, or at least one organophosphorus compound.

4. The method of claim 3, wherein said at least one organphosphorus compound is an acylphosphine oxide.

5. The method of claim 1, wherein said at least one photoinitiator is selected from the group consisting of acetophenone, anthraquinone, benzoin, benzophenone, 1-benzylcyclohexanol, phenyl ketone, thioxantone, and an organophosphorus compound or derivatives of any of these.

6. The method of claim 1, wherein said at least one corrosion inhibitor is selected from the group consisting of organometallic compounds, coated or uncoated inorganic pigments, aluminum phosphates, zinc phosphates, zinc salts of aminocarboxylates, of 5-nitroisophthalic acid or cyanic acid, polymeric amino salts with fatty acids, metal salts of dodecylnaphthalenesulfonic acid, amino complexes and transition metal complexes of toluenepropionic acid, silanes, and 2-mercaptobenzothiazolylsuccinic acid, and/or amino salts thereof.

7. The method of claim 5, wherein said organophosphorus compound is acylphosphine oxide.

8. The method of claim 1, wherein said wax is selected from the group consisting of paraffins, polyethylenes and polypropylenes and an oxidized wax.

9. The method of claim 1, wherein the melting point of the wax is in the range from 40 to 160° C.

10. The method of claim 1, wherein the dispersion comprises a wetting agent.

11. The method of claim 10, wherein said wetting agent comprises a polysiloxane.

12. The method of claim 1, wherein to the dispersion is added, as an inorganic compound in particle form, a divided powder or a dispersion with particles of a carbonate, oxide, silicate or sulfate.

13. The method of claim 12, wherein the inorganic compound has a particle size distribution in the range from 5 nm to 300 nm.

14. The method of claim 12, wherein as inorganic compound in particle form particles based on alumina, barium sulfate, silica, silicate, titanium oxide, zinc oxide and/or zirconium oxide are added.

15. The method of claim 1, wherein there is additionally an organic solvent and wherein the organic solvent is selected from the group consisting of at least one water-miscible alcohol, a water-soluble alcohol and a glycol ether.

16. The method of claim 15, wherein the amount of organic solvent is from 0.1 to 5% by weight.

17. The method of claim 1 wherein the resin contains acid groups and the acid groups of the the resin are stabilized by ammonia, an amine selected from the group consisting of morpholine, dimethylethanolamine, diethylethanolamine or triethanolamine or by an alkali metal hydroxide.

18. The method of claim 17, wherein the acid groups of the resins are stabilized by sodium hydroxide.

19. The method of claim 1, wherein the aqueous dispersion comprises at least one electrically conductive compound selected from the group consisting of an electrically conductive polymer or electrically conductive inorganic particles.

20. The method of claim 19, wherein said electrically conductive inorganic particles are less that 1 micron in average size.

21. The method of claim 1, wherein the aqueous dispersion comprises at least one of a biocide, a defoamer or a wetting agent.

22. The method of claim 1, wherein the metallic surface is composed essentially of aluminum, iron, copper, magnesium, nickel, titanium, zinc or of an alloy containing aluminum, iron, copper, magnesium, nickel, titanium and/or zinc or of two or more of these metallic substances.

23. The method of claim 1, wherein the metallic surface has been cleaned or galvanized, freshly cleaned or freshly galvanized, the galvanizaton consisting of zinc or of a zinc-containing alloy.

24. The method of claim 1, wherein the metallic surface comprises at least 80% of aluminum and has been cleaned, optionally pickled, optionally anodized, and optionally passivated.

25. The method of claim 1, wherein the metallic surface is cleaned and optionally pretreated with a pretreatment solution based on fluoride, iron-cobalt and/or phosphate.

26. The method of claim 1, wherein the metallic surface is contacted with the dispersion by the roller application method, by wetting and squeezing off, by flow coating or by dipping, and a wet film is developed.

27. The method of claim 1, wherein the metallic surface is wetted with the dispersion for a time of from 0.001 second up to 30 minutes.

28. The method of claim 1, wherein coating with the dispersion, the metallic surface has a temperature in the range from 5 to 60° C.

29. The method of claim 1, wherein the dispersion on coating has a temperature in the range from 5 to 60° C.

30. The method of claim 1, wherein the metallic surface contacted with the dispersion is dried by air-circulation heating methods, inductively and/or by radiant heat, wherein the volatile fractions of the dispersion are removed.

31. The method of claim 30, wherein the volatile fraction of the dispersion are removed by blowing.

32. The method of claim 1, wherein the metallic surface contacted with the dispersion is dried at a metallic surface temperature in the range from room temperature up to 180° C.

33. The method of claim 1, wherein the metallic surface contacted with the dispersion, when it has been dried so as to be substantially or entirely free of water, is irradiated with UV light in the range from 180 to 500 nm, in order to implement or initiate a polymerization reaction of the resin.

34. The method of claim 1, wherein before or both before and during the UV cure, the metallic surface contacted with the dispersion is physically dried.

35. The method of claim 1, wherein the coating after curing, amounts to a coatweight in the range from 0.2 to 20 $g/cm^2$.

36. The method of claim 1, wherein the cured coating has a thickness of from 0.1 up to 10 microns when cured.

37. The method of claim 1, wherein the cured coating has a Peros pendulum hardness in the range from 30 to 550 s.

38. The method of claim 1, wherein the cured coating is paintable.

39. The method of claim 1, wherein the coated surface is further coated with at least one further selected from the group consisting of a topcoat, an adhesive backing, a film, a foam and a print coat.

40. The method of claim 1, wherein the metallic surface the cured coating is cut, formed or jointed to another part by adhesive bonding, welding, soldering, clinching or riveting.

41. A metallic surface coated by the method of claim 1, wherein the metallic surface is selected from the group consisting of wire, wire winding, wire mesh, metal sheet, paneling, shielding, bodywork, part of a bodywork, a vehicle part, a trailer part, an RV part, an aircraft part, covering, casing, lamp, light, traffic light element, furniture item or furniture element, element of a household appliance, frame, profile, shaped part of complex geometry, guide-rail element, radiator element or fence element, bumper, part of or with at least one pipe and/or one profile, window frame, door frame, cycle frame, a bolt, a nut, a flange, a spring and a spectacle frame.

42. The method of claim 1, wherein the metallic surface is on a metal strip and is wetted with the dispersion for a time period of from 0.001 to 1 second.

43. The method of claim 1, wherein parts are coated and the metallic surface is wetted with the dispersion for 10 seconds to 30 minutes.

44. The method of claim 1, wherein an organic coating is formed, which, after curing, amounts to a coat weight in the range from 1 to 5 $g/cm^2$.

* * * * *